(No Model.)
L. F. JORDAN.
BATTERY BOX AND CASE.
No. 509,381. Patented Nov. 28, 1893.
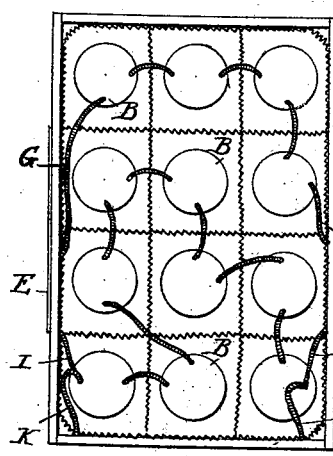
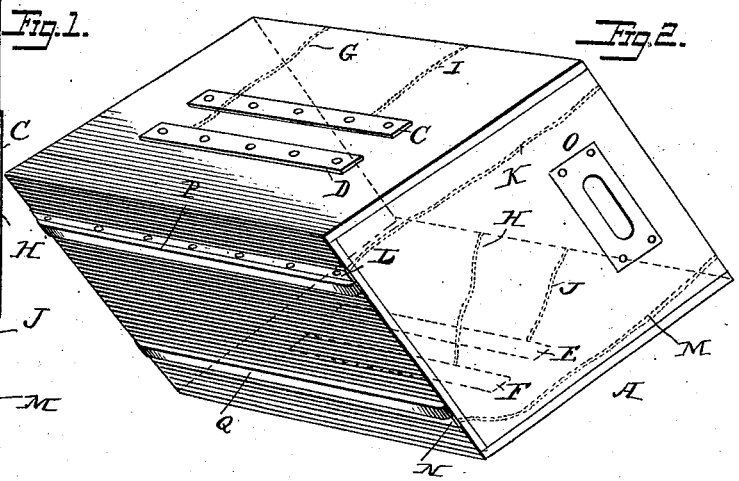
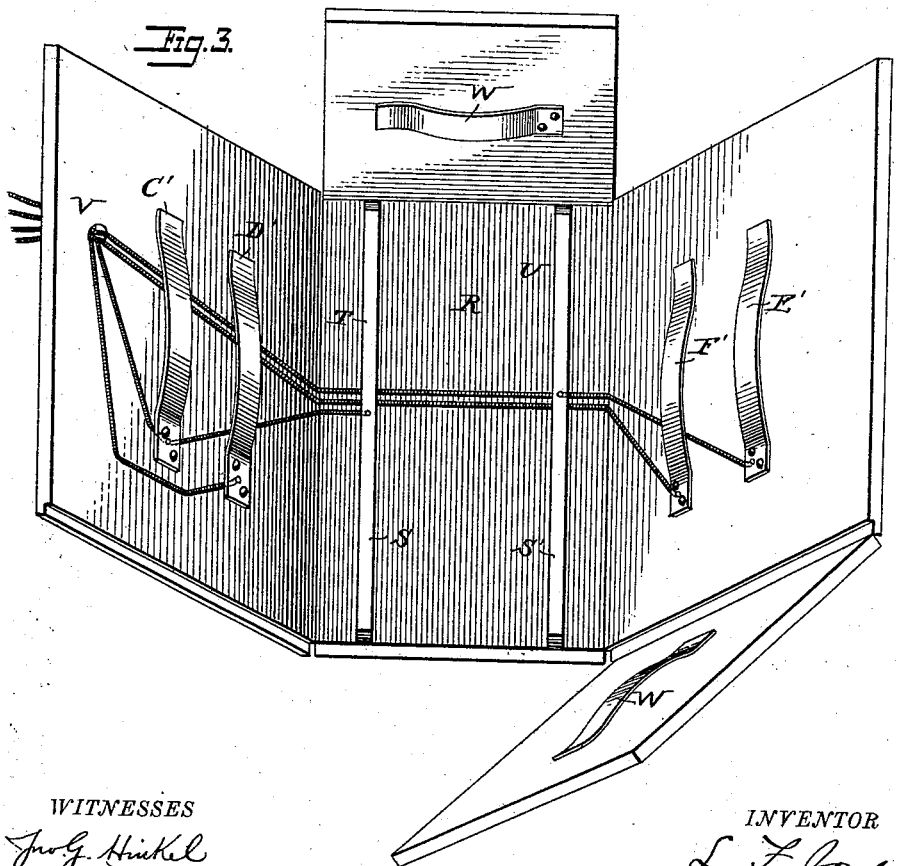
WITNESSES
INVENTOR

UNITED STATES PATENT OFFICE.

LINWOOD F. JORDAN, OF SOMERVILLE, MASSACHUSETTS, ASSIGNOR OF ONE-HALF TO HENRY B. BENNETT, OF PORTLAND, MAINE.

BATTERY-BOX AND CASE.

SPECIFICATION forming part of Letters Patent No. 509,381, dated November 28, 1893.

Application filed October 3, 1892. Serial No. 447,636. (No model.)

*To all whom it may concern:*

Be it known that I, LINWOOD F. JORDAN, a citizen of the United States, residing at Somerville, Middlesex county, Massachusetts, have invented certain new and useful Improvements in Battery-Boxes and Cases, of which the following is a specification.

In the use of electric batteries for railroad telegraph signals and other similar purposes where for instance the battery is to be located on the locomotive, or some other exposed position it is desirable to have means for protecting the battery as well as means, whereby, the battery cells can be readily changed or attached and detached to the electric circuits and as the engineer or other operatives are often not familiar with electrical devices and their connections it is further desirable that when the battery is placed in position the proper circuit connections shall be positively and properly made without the presence of a skilled electrician. It is with these objects in view, that my present invention is made, and it consists generally speaking in a battery box case having certain definite electric connections made therewith, and adapted to receive a battery box containing the requisite number of battery cells in such a manner that when the battery box is in place in its case, the proper circuit connections will be complete.

In the accompanying drawings, I have illustrated the preferred form of my improvement in which—

Figure 1, is a plan view of a battery box containing in the present instance twelve battery jars or cells. Fig. 2, is a perspective view of the box it being turned up to show the electrical contact pieces; and Fig. 3, is a perspective view of a battery box case with its top taken off, door opened, and the back and sides turned partially down for purposes of illustrating the circuit connections.

The battery box A may be made of any suitable material or form, adapted to contain the desired number of battery cells B, there being twelve shown in the present instance separated by a suitable packing medium $b$, which will prevent the accidental breakage or destruction of the jars. These cells may be connected up in any desired manner to suit the specific application of the invention and in the present instance I have shown them connected to form two circuits, one of which may be termed the main circuit and includes in this instance eight of the battery cells, while the other is a local circuit and includes in the present instance four cells. These cells are joined together in the desired manner, being shown as connected up in series, and the terminals are permanently connected with contact plates on the outside of the box.

In the present application, I have shown two plates or strips C—D and E—F arranged on opposite sides of the box forming the external contacts, and the terminal G on one side of the local battery is connected to the plate D, while the terminal H passes down the other side of the box and is connected to the corresponding plate F.

The terminal I of the main circuit passes down through the inside of the box and is connected to the plate C while the terminal J at the other end of the main circuit also passes down through the sides of the box and is connected to the plate E. In order that there may be two connectors to each terminal of the main circuit so as to be sure of a good electric contact, I provide the main circuit with another series of terminals. The wire K is attached to the cell at one end of the series being passed down through to the bottom of the box and being connected to the metal plate or strip L secured thereto while the wire M in a similar manner passes down the other side of the box and is connected to a corresponding plate N also arranged on the bottom of the box. It will thus be seen that the main circuit has two sets of terminals, one set from the sides and the other from the bottom of the box.

The box is preferably provided with suitable handles O set into the ends of the box, whereby, it may be easily transported and secured to the bottom of the box, are two pieces or strips P—Q which are preferably arranged adjacent the metal strips L—N and extend below the same, so as to form feet or supports for the box when it is removed from its case. From this construction it will be seen that the battery box can be transported and moved from place to place and that the battery cells can be cleaned and arranged in the battery box when desired, so that it is ready for operation when put in proper position in its case.

The case may be of any suitable and desired construction being preferably made of wood or other non-conducting material and its bottom R is provided with two strips S—S' having on their faces metallic plates T—U. These strips S—S' are preferably arranged so that when the battery box is in position they lie parallel to, and just outside of the corresponding strips P—Q on the bottom of the box, and consequently the plates T—U of the case will bear upon and make contact with the plates L and N on the bottom of the box. Secured on the interior of the sides of the box, are spring contact plates C'—D'—E'—F' which are shown as bowed at their centers and arranged to make contact with the corresponding contact plates C—D—E—F on the sides of the box, when the box is in position in the case. These contact plates as well as the plates T and U are properly and permanently connected with the wires which are conveniently passed through an opening V in one side of the box, and the circuits are arranged in the manner shown so that the contact plates C' and T which bear against the plates C and L respectively on the box, are connected to one terminal of the circuit, while the plates E' and U which bear respectively against the plates E and N on the box are connected to the other terminal of the circuit, thus furnishing two paths or connections between the terminals of the main circuit and the main battery.

The ends of the box case are provided with springs W, which fit against the ends of the box when it is in place and serve to take up the shocks or jolts, together with the spring contact pieces on the sides of the box, and thus lessen the danger of disturbance of the battery cells in the box. This case may be provided with any suitable cover not shown for the sake of clearness in the drawings.

While the box may be applied to the case in different ways, I prefer to slide it in at one end, as in this connection the contacts become sliding contacts and are therefore less liable to offer a resistance to the passage of the current through any rust or deterioration of their contact surfaces.

In some instances I find it desirable to connect half of the battery cells in the main circuit and half in the local circuit and the battery box may be slid either end first into the case.

From the above description it is evident that the details of construction and arrangement of the box may be varied by those skilled in the art to adapt it for the purposes for which it is designed, and I have illustrated my invention arranged especially with reference to the car telegraph system shown in my application, Serial No. 330,599.

What I claim is—

1. A battery box containing a number of battery cells having exterior contact plates connected with the terminals of the cells, combined with a battery box case having interior contacts engaging the exterior contacts of the box, there being two sets of contact plates electrically connected to each of the terminals of the batteries, substantially as described.

2. A battery box containing a number of battery cells, having longitudinal contact strips on its side and bottom connected to the terminals of the cells, combined with the battery box case having spring contact plates connected to the side of the case to make abutting electric contact, substantially as described.

In testimony whereof I have signed my name to this specification in the presence of two subscribing witnesses.

LINWOOD F. JORDAN.

Witnesses:
BYRON C. VERRILL,
FRANKLIN C. PAYSON.